UNITED STATES PATENT OFFICE.

CHRISTOPHER RIS, OF BASLE, SWITZERLAND, ASSIGNOR TO ANILINE COLOUR AND EXTRACT WORKS, FORMERLY JOHN R. GEIGY, OF BASLE, SWITZERLAND, A CORPORATION.

BLUE SULFUR DYE AND PROCESS OF MAKING SAME.

SPECIFICATION forming part of Letters Patent No. 696,751, dated April 1, 1902.

Application filed August 28, 1901. Serial No. 73,540. (No specimens.)

*To all whom it may concern:*

Be it known that I, CHRISTOPHER RIS, a citizen of the Swiss Confederation, residing at Basle, Switzerland, have invented a new and useful Process of Producing Blue Sulfur Dye and the Product Thereof, of which the following is a specification.

This invention relates to the production of a new blue sulfur dyestuff by transformation of dimethyl-para-amido-phenyl-quinonimid of the formula

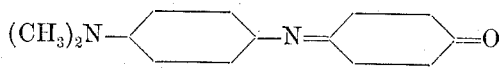

into a new sulfo-acid by means of a normal sulfite and then melting the same with polysulfids of alkali.

The dimethyl-para-amido-phenyl-quinonimid, generally called "indophenol," may be obtained, as it is known, by oxidation of dimethyl-paraphenylenediamin, together with carbolic acid, best by means of hypochlorite of sodium.

The following examples may be given in order to explain the method of carrying out the process.

First example: A paste containing 22.6 parts of the indophenol from dimethylparaphenylenediamin and phenol (dimethyl-para-amido-phenyl-quinonimid) is well suspended by stirring it with about two hundred and fifty parts of water. Then a solution of twenty-five parts of crystallized sodium sulfite ($Na_2SO_3+5aq$) is added and the mass stirred at ordinary temperature (of about 20° centigrade) till the indophenol has disappeared and a slightly-colored solution with a small grayish precipitate is formed. Then the solution is filtered and acidulated with hydrochloric acid. A thick crystalline white precipitate of the new dimethyl-para-amido-paraoxydiphenylamin sulfo-acid is obtained, which after some hours' rest is filtered off, pressed, and dried. The reaction may also be carried out in presence of alkalies, such as sodium carbonate or ammonia. Also an acceleration of the transformation may be attained by an increase of the temperature to, for instance, 50° to 60° centigrade or to boiling-point. The new sulfo-acid forms a white crystalline powder which dissolves difficultly in cold water, easily in hot water and in alkaline solutions, such as carbonate of sodium. Oxidizing agents produce in an acid solution a pure-blue coloration and in alkaline solution a bluish-green coloration of the corresponding indophenol sulfo-acid. The constitution—viz., the position—of the sulfo rest has not yet been determined.

Second example: Ninety parts of crystallized sodium sulfid ($Na_2S+3aq$) and thirty parts of sulfur are melted together till a solution is obtained. Then a solution of forty parts of sodium salt of the sulfo-acid of dimethyl-para-amido-paraoxydiphenylamin (obtained according to the first example) in about one hundred parts of water is added. Then the mass is heated up and evaporated till a temperature of 120° to 130° centigrade is reached and maintained at this temperature as long as an augmentation of the coloring-matter can be observed in a test which is dissolved in water and oxidized with hypochlorite of sodium or by the oxygen of the air, which point may be attained after, for instance, forty to sixty hours. The process is carried out in an iron vessel furnished with a reflux apparatus. Then the melted mass is dissolved with about one thousand parts of water and the formed leuco compound of the color oxidized by a current of air, whereby the color precipitates in blue flocks. The oxidation and precipitation may also be attained by addition of an oxidizing agent, such as hypochlorite of sodium, which is added till the liquor is almost uncolored, when a test is brought upon filtering-paper. Then the coloring-matter is filtered off and brought in form of a paste, or it is pressed and dried at a low temperature. The dyestuff may also be isolated in form of its leuco compound and the latter subjected to a further oxidation. For instance, Third example: The solution of the leuco compound of the coloring-matter obtained according to the preceding example is acidulated with hydrochloric acid, filtered off, and the leuco compound thus obtained, which is insoluble in solutions of mineral acids, is washed out, suspended with about one thousand parts of water, then alkalized by addition of carbonate of sodium or of caustic-soda lye. Then a current of air is blown through the suspension till no more augmentation of the intensity of the color can be observed; or the oxidation may be performed by addition of hypochlorite of sodium, or of peroxid of sodium, or of hydrogen, or of a similar oxidizing agent. Then the coloring-matter is filtered off.

The new coloring-matter forms a blue paste or in dry state a blue powder with metallic aspect. It is almost insoluble in water and in sodium carbonate, easily soluble in a hot solution of caustic soda with a pure-blue coloration, scarcely soluble in alcohol, insoluble in ether and benzene, soluble in concentrated sulfuric acid, giving a blackish-blue solution. Insoluble in diluted mineral acids it is easily soluble in sodium sulfite, first with pure-blue color, which by addition of an excess of sodium sulfid turns to a clear grayish-violet solution, which grows pure blue by the oxygen of the air. The new coloring-matter dyes unmordanted cotton in a bath containing sodium sulfid and salt in pure-blue shades of great fastnesses to soap, to light, to acids, alkalies, and of considerable fastness to chlorin.

I claim—

1. The process of making a new blue sulfur dyestuff by reacting on dimethyl-para-amido-phenyl-quinonimid, viz., the indophenol from dimethylparaphenylenediamin and carbolic acid, of the following formula:

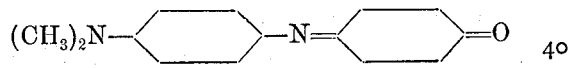

with a normal sulfite to form a new sulfo-acid of dimethyl-para-amido-paraoxydiphenylamin, and then melting the same with polysulfid of alkali, substantially as described.

2. As a new article of manufacture the blue sulfur dyestuff derived from dimethyl-para-amido-paraoxydiphenylamin sulfo-acid, which forms a blue paste or in dry state a blue powder with metallic aspect, almost insoluble in water and in carbonate of sodium, easily soluble in a hot solution of caustic soda with a pure-blue coloration, scarcely soluble in alcohol, insoluble in ether and benzene, soluble in concentrated sulfuric acid with blackish-blue color, insoluble in diluted mineral acids, easily soluble in sodium sulfid to a pure-blue solution, turning by an excess of sodium sulfid to a clear grayish-violet solution, growing pure blue by the oxygen of the air, and dyeing unmordanted cotton in a bath containing sodium sulfite and salt pure-blue shades of great fastness, substantially as described.

In testimony that I claim the foregoing as my invention I have signed my name in presence of two subscribing witnesses.

CHRISTOPHER RIS.

Witnesses:
ALBERT GRAETER,
GEO. GIFFORD.

It is hereby certified that in Letters Patent No. 696,751, granted April 1, 1902, upon the application of Christopher Ris, of Basle, Switzerland, for an improvement in "Blue Sulfur Dyes and Processes of making same," an error appears in the printed specification requiring correction as follows: In line 62, page 1, the formula printed "$Na_2S + 3\ aq$" should read $Na_2S + 9\ aq$; and that the said Letters Patent should be read with this correction therein that the same may conform to the record of the case in the Patent Office.

Signed and sealed this 15th day of July, A. D., 1902.

[SEAL.]

E. B. MOORE,
*Acting Commissioner of Patents.*